(No Model.) 7 Sheets—Sheet 1.

H. P. BROWN.
ELECTRIC MOTOR CAR.

No. 518,221. Patented Apr. 17, 1894.

(No Model.) H. P. BROWN. 7 Sheets—Sheet 2.
ELECTRIC MOTOR CAR.
No. 518,221. Patented Apr. 17, 1894.

(No Model.) 7 Sheets—Sheet 3.
H. P. BROWN.
ELECTRIC MOTOR CAR.
No. 518,221. Patented Apr. 17, 1894.

Witnesses:
S. E. Curtis
H. W. Munday

Inventor:
Harold P. Brown
By Munday, Evarts & Adcock
His Attorneys.

(No Model.) 7 Sheets—Sheet 5.

H. P. BROWN.
ELECTRIC MOTOR CAR.

No. 518,221. Patented Apr. 17, 1894.

Witnesses:
Geo. E. Curtis.
H. W. Munday.

Inventor:
Harold P. Brown
By Munday, Evarts & Adcock.
His Attorneys.

(No Model.) 7 Sheets—Sheet 6.
H. P. BROWN.
ELECTRIC MOTOR CAR.
No. 518,221. Patented Apr. 17, 1894.
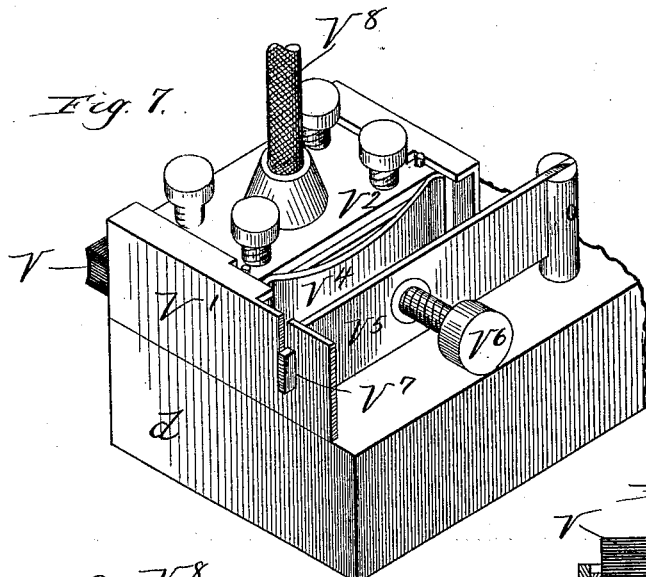
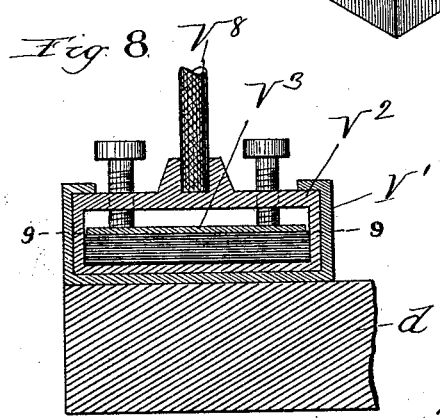
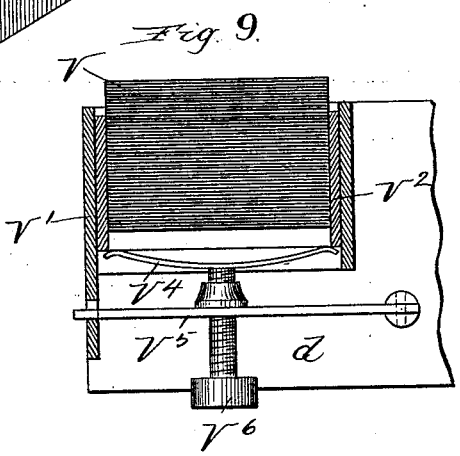
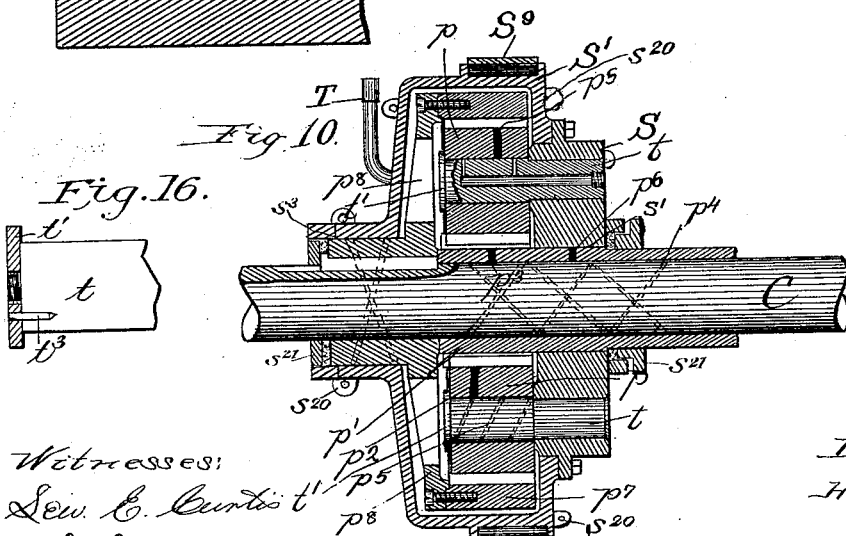
Witnesses:
Lew. E. Curtis
H. W. Munday
Inventor:
Harold P. Brown
By Munday, Evarts & Adcock
His Attorneys (No Model.)  H. P. BROWN.  7 Sheets—Sheet 7.
ELECTRIC MOTOR CAR.
No. 518,221.  Patented Apr. 17, 1894.
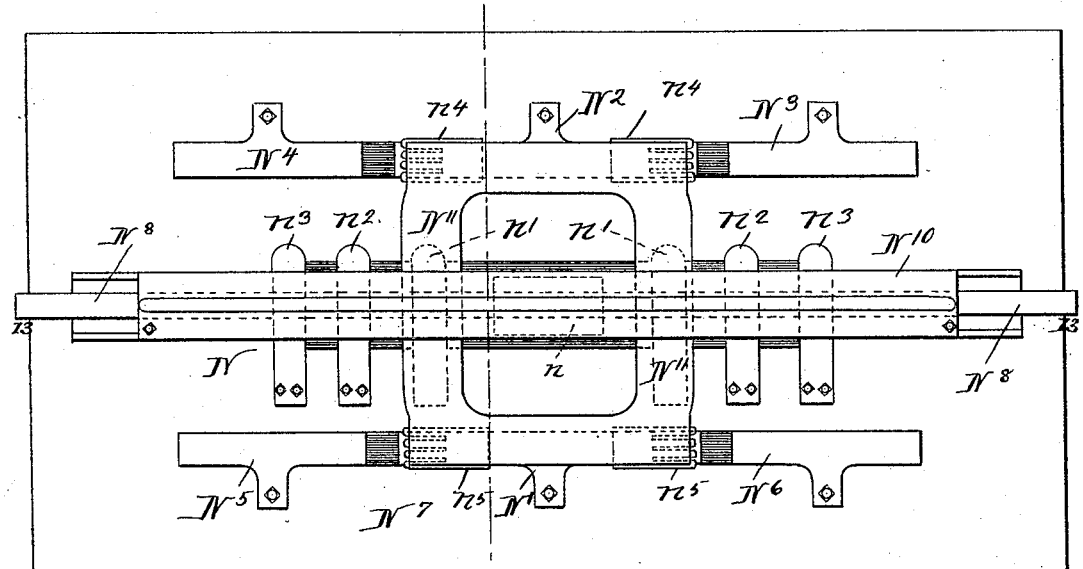
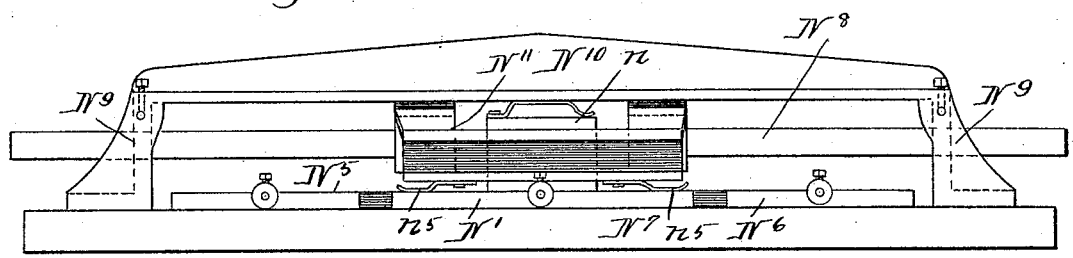
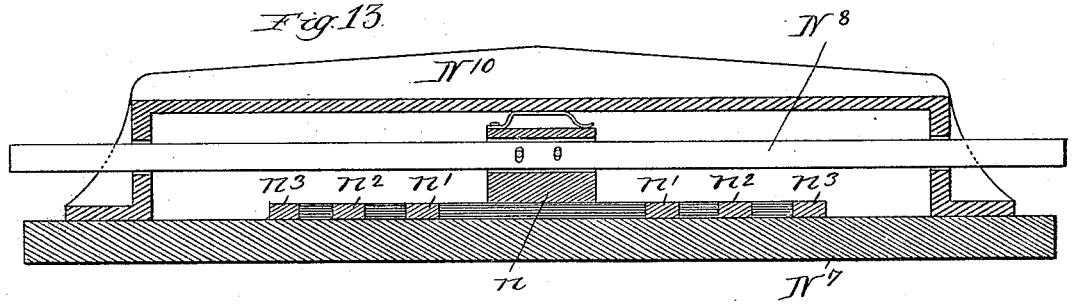

UNITED STATES PATENT OFFICE.

HAROLD P. BROWN, OF NEW YORK, N. Y.

ELECTRIC-MOTOR CAR.

SPECIFICATION forming part of Letters Patent No. 518,221, dated April 17, 1894.

Application filed December 21, 1891. Serial No. 415,685. (No model.)

*To all whom it may concern:*

Be it known that I, HAROLD P. BROWN, a citizen of the United States, residing in New York, in the county of New York and State of New York, have invented a new and useful Improvement in Electric-Motor Cars, of which the following is a specification.

My invention relates to improvements in electric motor cars and more especially to certain improvements upon the electric motor car shown and described in my application, Serial No. 353,244, filed May 26, 1890, upon which Patent No. 449,752 was issued April 7, 1891.

Figure 1:
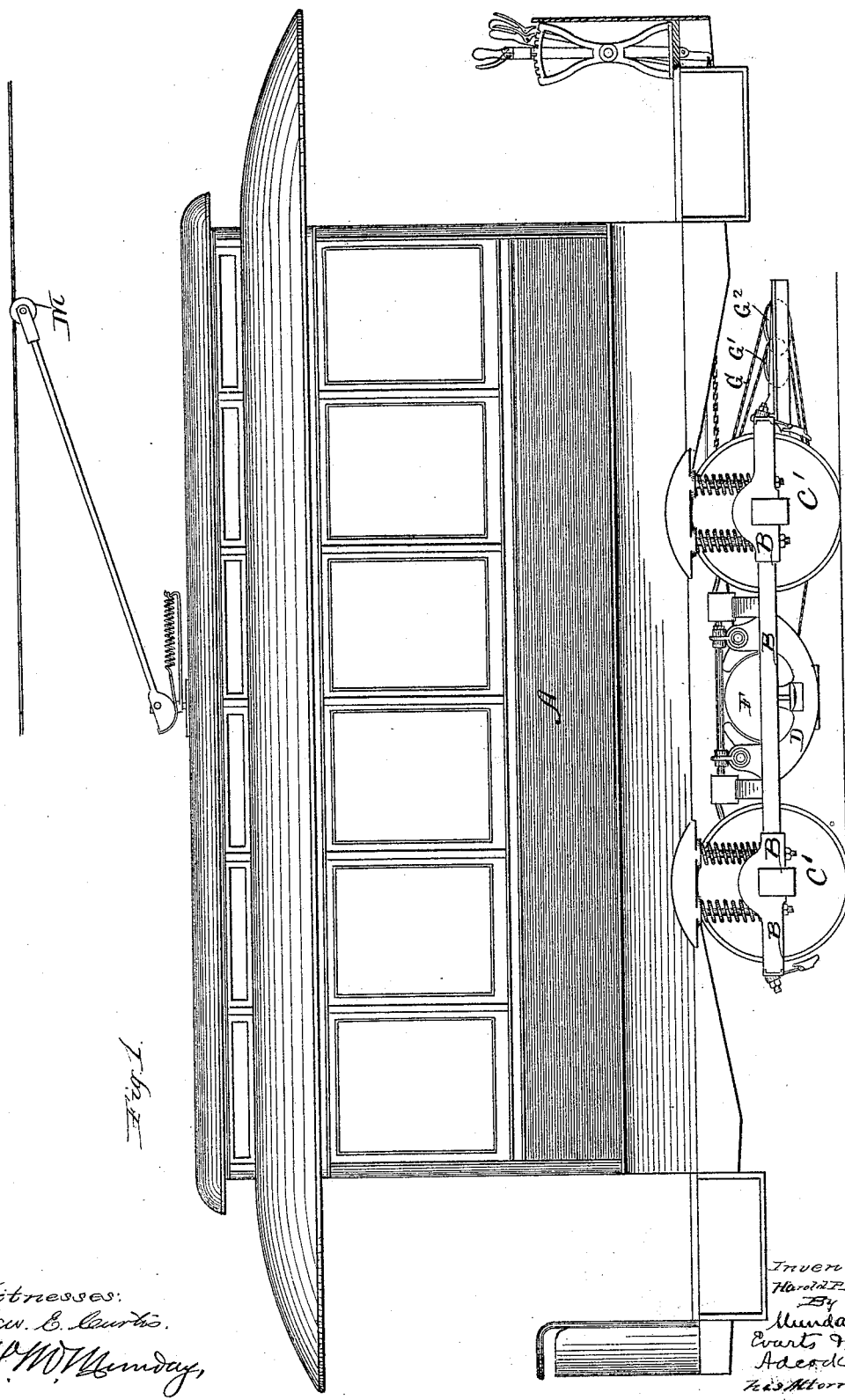
Figure 2:
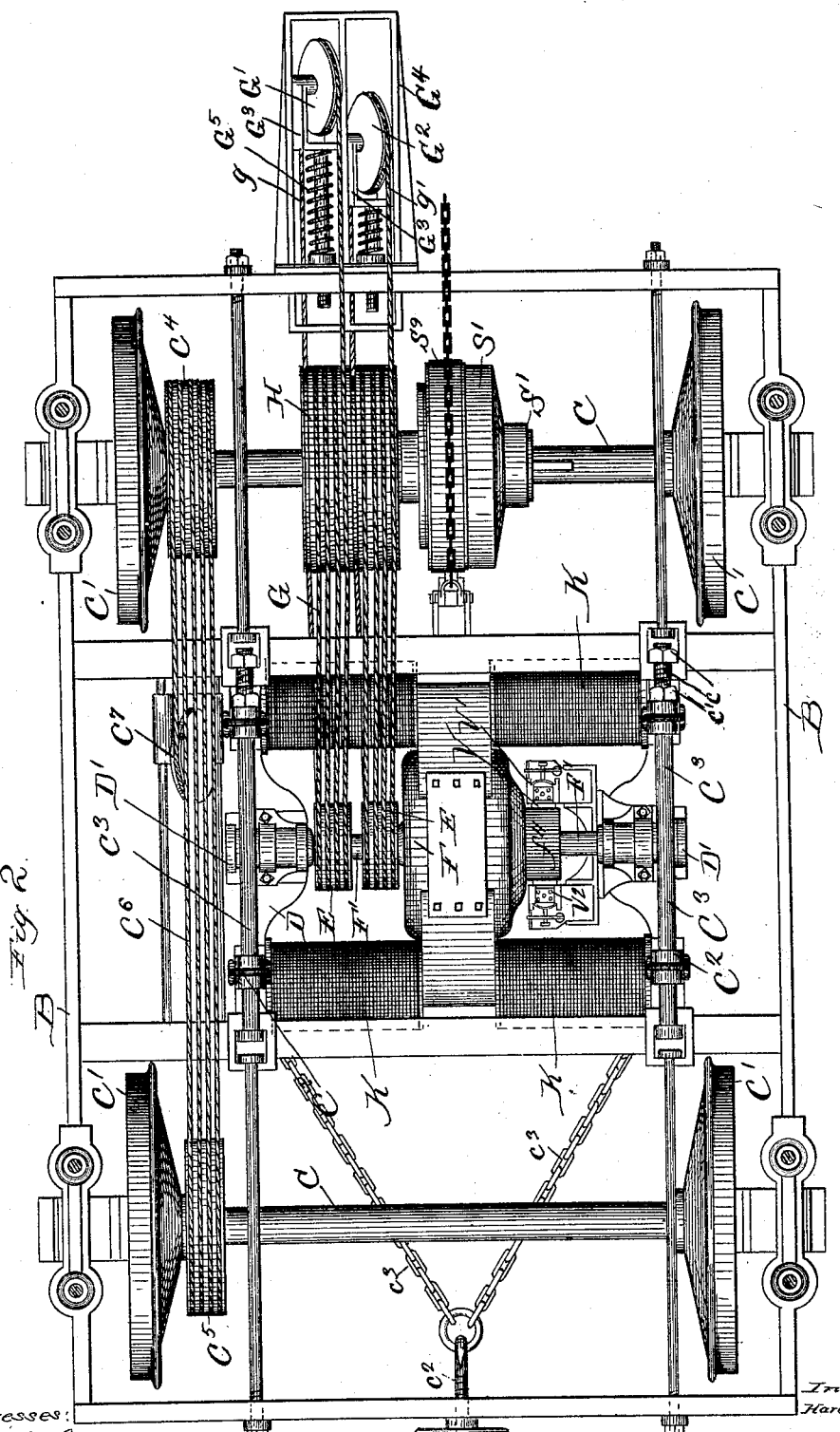
Figure 3:
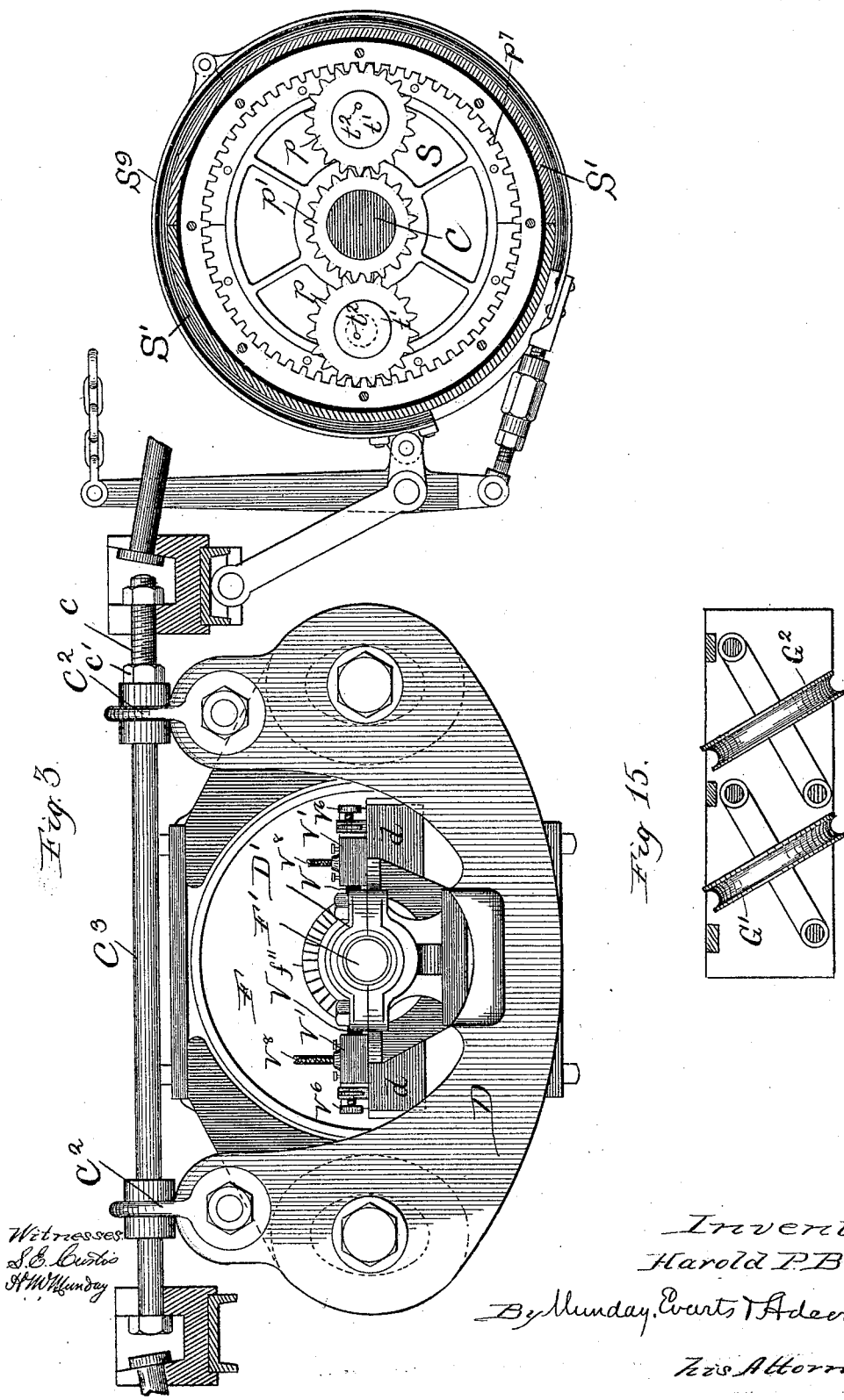
Figure 4:
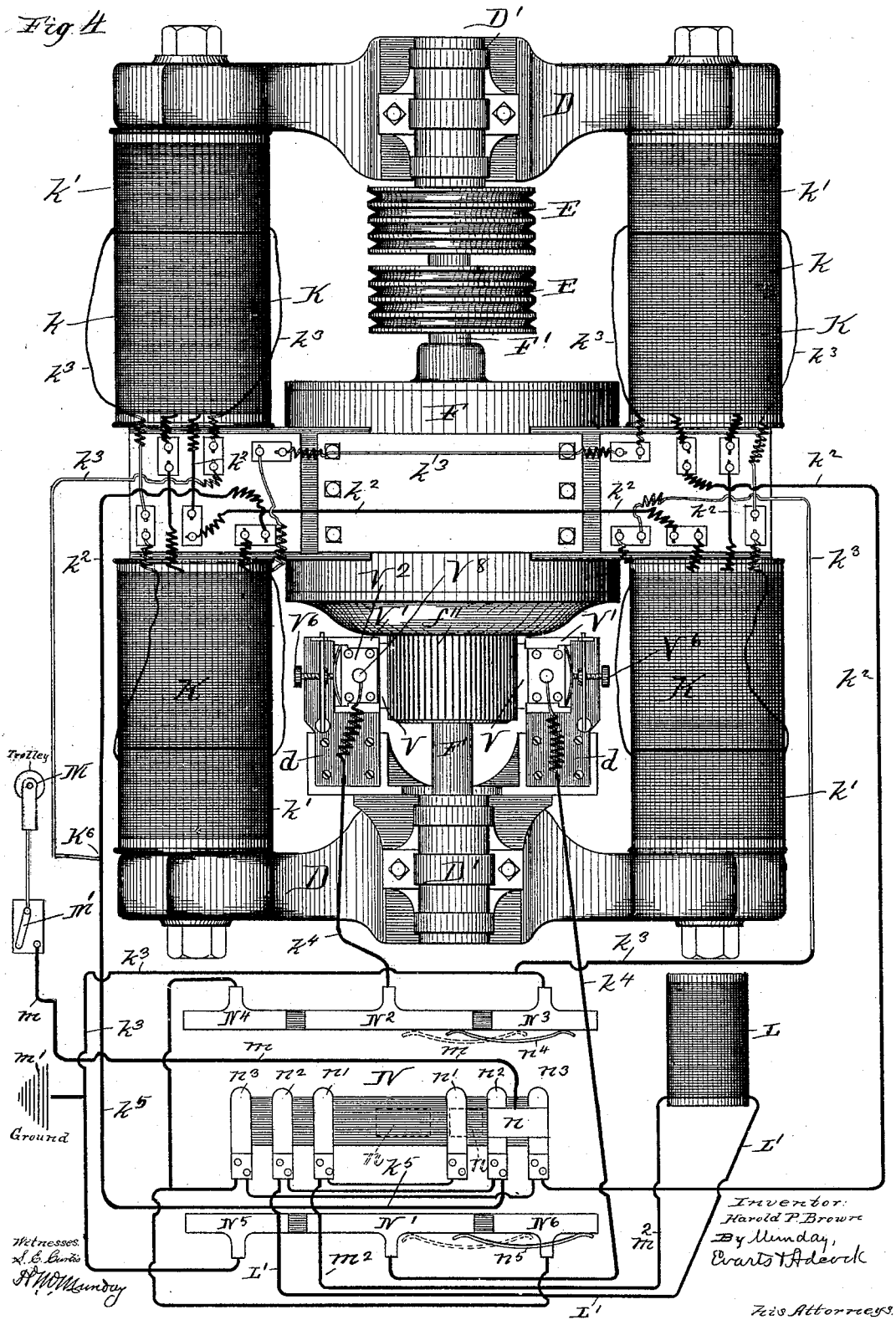
Figure 5:
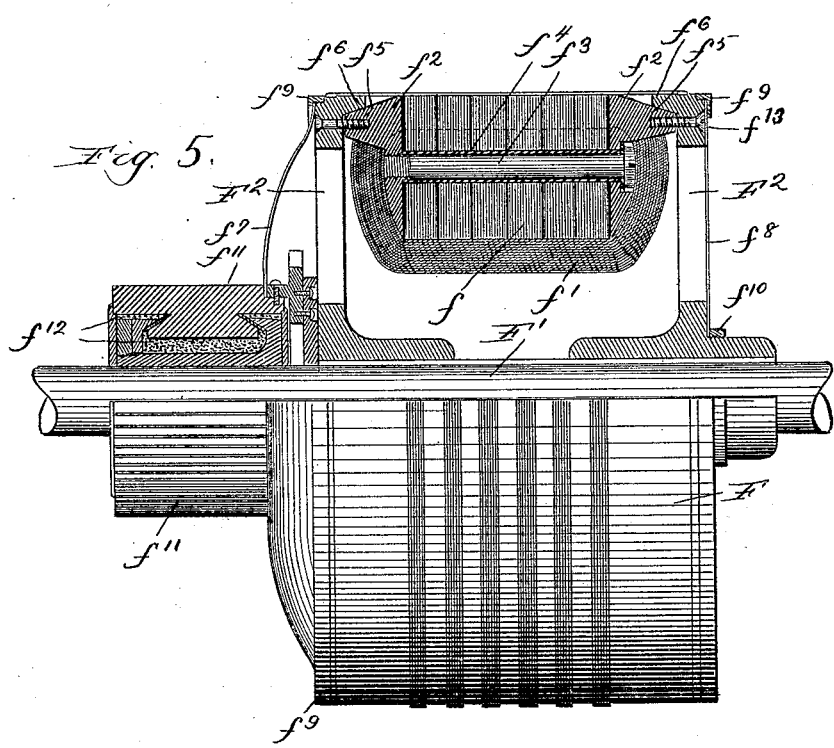
Figure 6:
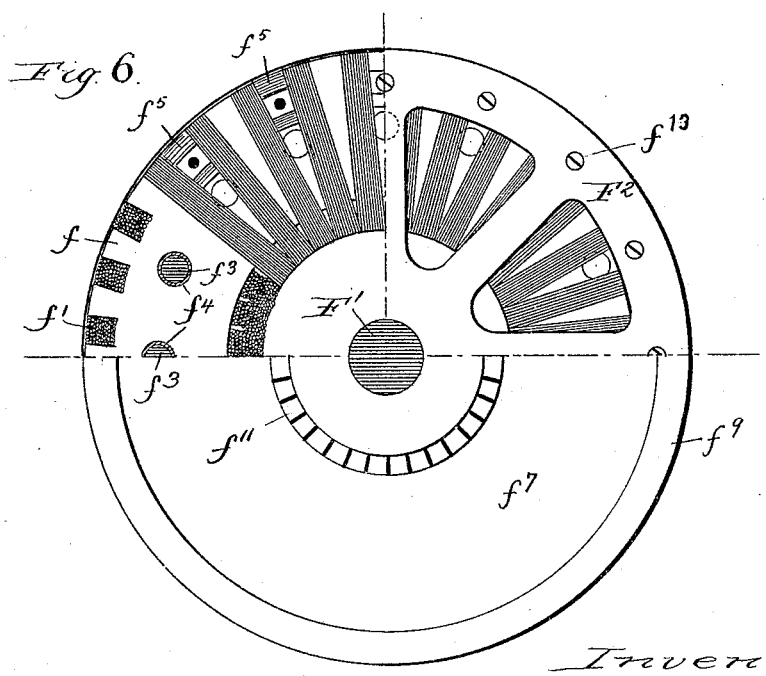

In the accompanying drawings which form a part of this specification and in which similar letters of reference indicate like parts, Figure 1 is a side elevation of a car embodying my invention. Fig. 2 is a detail plan view showing the truck frame, the motor and rope transmission for communicating motion from the motor to the car axles. Fig. 3 is an enlarged sectional elevation showing the motor and its frame or support and the reducing gear and its brake or friction shoe. Fig. 4 is an enlarged plan view of the motor, showing also a diagram of the circuits or wire connections. Fig. 5 is a detail sectional view showing the construction of the armature.
Fig. 6 is a partial cross section of the armature. Fig. 7 is a detail perspective view of the brush holder. Fig. 8 is a cross section of the same. Fig. 9 is a section on line 9—9 of Fig. 8. Fig. 10 is a central sectional view showing the friction wheel and its brake and the reducing gear. Fig. 11 is a detail plan view of the switch mechanism. Fig. 12 is a side elevation of the same. Fig. 13 is a vertical section on the line 13—13 of Fig. 11.
Fig. 14 is a cross section on the line 14—14 of Fig. 11. Fig. 15 is a detail view of the rope transmission tightener pulleys, and Fig. 16 is a detail view of a part hereinafter described.

My present invention or improvement consists in connection with the truck frame, the motor and rope transmission of power from the motor to the car axle, in mounting the motor upon guides or ways, so that by sliding the motor on such ways the slack in the rope connection produced by the stretching of the rope from time to time as it wears may be taken up when necessary. Owing to the doubling of the rope or its number of loops, a slight movement of the motor on the truck frame will enable a great amount of stretch in the rope to be taken up from time to time as required. This provision for taking up the stretch of the rope is additional to the use of the rope tightener pulley shown and described in my previous application before referred to, and which serves to accommodate any slight stretch or variation in the rope connection and to keep the same under proper tension.

Another feature of my improvement consists in the means I employ to vary the speed and power of the motor as occasion may require to run the car fast or slow, as desired, or to propel a heavy or light load, so that when the load is heavy the motor will automatically develop the greatest amount of power but will at the same time run more slowly, while on the other hand, when the load is entirely removed, for example, the motor will be automatically prevented from running at too great a rate of speed. It is well known that a shunt motor tends to run at the same speed whenever the load, other things being equal, and such motor thus tending to start the car suddenly will necessarily produce excessive sparking. On the other hand a series motor in use with my friction wheel starting gear mechanism would tend to run at too high speed when the car is stopped and no load put on the starting gear. In order to avoid both these defects and accomplish the result before named, I use on my motor car a sufficient amount of series winding of the field magnets of the motor to check the speed of the motor when starting a load, and at the same time to deliver a large amount of power at this slower speed; I give a sufficient number of turns to the shunt windings of the field magnets to prevent the motor from running beyond a certain predetermined speed when the load is removed. In addition to this I place in circuit with the series coils of the field magnets an electro magnet which I term a choking magnet. This choking magnet is placed in the series field circuit when the motor is first started in order that its self induction may check the first rush of current through the motor, until it has acquired sufficient speed or headway to develop counter-electro motive force, thus saving the necessity of using a large amount of non-reactive resistance which would otherwise be required to produce the same effect, and at the same time preventing the mechanical strain on the motor which would otherwise be caused by sudden starting, and the electrical strain on the insulation which would otherwise be caused by a sudden flow of current. This choking magnet which is adapted to be placed in the series field circuit also affords me a convenient means in connection with the compound winding of the field magnets of varying the speed of the motor and thus regulating the speed of the car as required. This I do by providing a switch, which when first closed puts into circuit with the series field coils this choking magnet furnished with considerable self induction or a large amount of wire. The motor may thus be given a greater speed by first short circuiting this choking coil and still greater speeds by successively short circuiting one or more of the series field magnets and thereby increasing the speed of the armature.

My invention also consists in the novel devices and novel combinations of parts and devices herein shown and described and more particularly pointed out in the claims.

In the drawings A represents the car, B the truck frame, C the car axles, C' its wheels, $C^2$ the links by which the motor frame D is suspended from the guides or ways $C^3$ on the truck frame B.

F represents the revolving armature of the motor, and F' its shaft journaled in suitable bearings D' on the motor frame D. The shaft F' is provided with a grooved driving pulley E, around which the rope connection G passes to the grooved pulley H surrounding the car axle C. Two loops $g$ and $g'$ of the rope connection G pass around the rope tightener pulleys G' and $G^2$. The rope tightener pulleys G' and $G^2$ are journaled in sliding boxes $G^3$ which slide in guides $G^4$. Springs $G^5$ act against these rope tightener pulleys and serve to keep the requisite tension upon the rope. The rope tightener pulleys are preferably set at an inclination as shown in the drawings, so that they will thus serve to take the rope for example, from the first groove of one pulley and return it to another groove of the same pulley. The two axles C C are each furnished with additional grooved pulleys $C^4$ $C^5$ around which passes a rope connection $C^6$, one loop of this rope passing around a rope tightener pulley $C^7$.

The motor frame D or its suspending links $C^2$ is mounted to slide on the guides $C^3$ of the truck frame, so that this sliding movement of the motor may serve to take up the stretch in the rope connection G. The adjustment of the motor frame on the truck frame to take up this stretch or slack in the rope connection may be effected by any suitable means, as for example, adjusting screws and nuts $c$ $c'$ on the guide rods $C^3$. But the means which I prefer to use for this purpose consists in an adjusting screw $c^2$ which is connected by any suitable means, as for example chains $c^3$, with the motor frame or its hangers. The revolving armature F of the motor has a core consisting of a series of separate annular disks or thin rings $f$ around which the coils $f'$ are wound. The soft iron disks $f$ forming the armature are held together by two non-magnetic rings $f^2$ $f^2$ of brass or other suitable material, one on each side, united by screws $f^3$ which are insulated electrically from one of the two non-magnetic rings, as well as from all of the soft iron rings $f$ composing the armature. These screws $f^3$ are of greater diameter than the distance between the coils instead of being smaller and passing between the coils as is the usual practice. The insulation of these screws or bolts $f^3$ is effected by a tube of insulating material $f^4$ surrounding each bolt. The non-magnetic clamping rings $f^2$ are provided on their outer edges with beveled projections $f^5$ which fit in the corresponding beveled or wedging faces or rims $f^6$ of the spiders $F^2$, the hubs of which fit on the shaft of the armature; so that by forcing the spiders together and against the beveled projections $f^5$ of the clamping ring $f^2$, the armature is firmly and solidly held in position, and at the same time centered with the shaft. The beveled rims or flanges $f^6$ on the spiders in connection with the beveled projections $f^5$ on the rings $f^2$ avoids the shearing strain on the bolts, and at the same time permits the use of large bolts and utilizes the greatest possible space for the coils of the armature as the coils are wound over the ends of the bolts $f^3$, and thus increases its efficiency as well as very greatly simplifies its construction. By this means also the armature is given a perfectly rigid and solid construction rendering it almost as strong as though it were made in one piece.

$f^7 f^8$ represent annular disks of vulcasbeston, or other non-conducting material adapted to resist moisture and heat, which serve the purpose of closing the ends of the armature and thus exclude dirt and moisture therefrom. These disks $f^7 f^8$ are clamped to rims $f^6$ of the spiders by clamping rings $f^9$, and at the center by clamping rings $f^{10}$ on one side and by the commutator $f^{11}$ on the other. The clamping rings $f^9 f^9$ may be secured in any suitable manner as by screw threads or by small rivets or screws; they serve to lock in place the screws $f^{13}$. The field magnets K of the compound motor have series field coils $k$ and shunt field coils $k'$ so proportioned that when the load is heavy, the motor will automatically develop the greatest amount of power, but will at the same time run more slowly; and so that when the load is entirely removed, the motor will be automatically prevented from running at too high a speed by the strength of the shunt field magnets or coils.

In the diagram Fig. 4, the circuit wire connections leading to the series coils $k$ are indicated at $k^2$ and that to the shunt coils at $k^3$. $k^4$ is the circuit wire leading to the armature.

M represents the trolley, M' a switch or button for turning the current on or off from the motor, and $m$ the circuit wire leading from the trolley to the motor and thence to the ground at $m'$.

L represents what I term the choking magnet, and L' a circuit wire leading from the switch N to this choking magnet, so that it may be cut in or out as desired.

The switch N comprises twelve stationary contact pieces N' and $N^2$ which are connected to the armature terminals, $N^3$ and $N^5$ which are connected to the ground $m'$ and to the inner end of the shunt field by the wire $k^3$, $N^4$ and $N^6$, and $n^3$ $n^3$, which are connected together and to the inner end of the series field, $n^2$ $n^2$, which are connected together to the outer end of series field, the outer end of shunt field and to the inner end of choking coil L; and contacts $n$ $n'$, which are connected together and to the outer end of choking coil L. The twelve stationary contact pieces are all mounted upon and suitably insulated on a bed plate $N^7$ which is preferably of insulating material. The stationary contact pieces N', $N^5$, and $N^6$ are arranged in a row on one side of the bed plate, and the contacts $N^2$, $N^3$ and $N^4$ in a like row on the opposite side, and the contact pieces $n'$, $n^2$, $n^3$ and their duplicates $n'$, $n^2$, $n^3$ are arranged in the middle of the switch plate three on each side of its longitudinal center, as indicated clearly in the drawings at Figs. 4 and 11. The three movable pieces $n$, $n^4$ and $n^5$ are all mounted upon and operated by a reciprocating switch bar $N^8$ which slides in suitable bearings $N^9$ formed in a bracket or frame plate $N^{10}$ secured to the switch plate $N^7$. The contact piece $n$ is secured to the under side of the switch bar $N^8$. It is adapted to overlap two of the contact pieces $n'$, $n^2$, $n^3$ and thus connect the same electrically together. The contact pieces $n^4$ and $n^5$ are each secured to a bridge piece $N^{11}$ carried by the switch bar $N^8$, as is clearly indicated in Figs. 11 and 12 of the drawings.

Referring to Fig. 4, the circuit leads from trolley M through switch M' and wire $m$ to switch contact $n$ of the switch N. When the contact $n$ is on the first stationary contact $n'$ the current will flow through wire $m^2$, choking coil L, wire L', contact point $n^2$, wire $k^5$ to the point $K^6$; here the circuit divides, part passing through the shunt field magnets $k'$ by the wire $k^3$ and to ground at $m'$, while the major portion passes through wire $k^2$, series magnets $k$, wire $k^2$, switch contacts $n^3$, $N^6$, $n^5$, and $N'$, wire $k^4$, through armature, entering at right hand brush wire $k^4$, switch contacts $N^2$, $n^4$ and $N^3$ and to the ground. The opening of the main circuit by moving contact $n$ away from contact $n'$ will allow the shunt circuit first described to discharge through the low resistance circuit last described, before the armature circuit is opened at $n^4$ and $n^5$; and in starting the shunt circuit is closed before the main circuit is completed, as shown by the dotted lines at $n$, $n^4$ and $n^5$. This is important as otherwise the shunt field in discharging would be liable to puncture its own insulation. When the choking coil L is in circuit it acts by its slow charging, and by the interposition of its resistance, to allow the motor armature to get under headway. Moving contact $n$ until it touches contacts $n'$ and $n^2$ (on either side of the center) will short circuit coil L and allow the full pressure of the trolley M to reach the motor terminals, thus increasing the motor's speed and power. If it is desired to run the motor still faster, contact $n$ can be moved until it touches both $n^2$ and $n^3$, thus short-circuiting the series field and thus increasing the speed of armature. Intermediate points may be added, if desired, short circuiting portions of the series field, thus giving different rates of speed.

If the contact $n$ is in the position shown in Fig. 4 the series fields are short circuited and the motor becomes a plain shunt motor; and if the circuit is then opened at switch M' the shunt field will be able to discharge through the armature.

The usual practice heretofore with shunt motors is to open the armature circuit first and then the field, getting from the latter a violent spark. On the other hand it has been necessary with plain shunt in starting to first close the field and then the armature circuit, as otherwise the armature would short circuit the shunt field and the motor would not start. Both these difficulties it will be seen are overcome by my invention. To reverse the motor the movable contacts are pushed from the center to the left. Movable contact $n^4$ first connects $N^2$ to $N^4$ and movable contact $n^5$ connects $n'$ to $n^5$. Thus when movable contact $n$ strikes $n'$ the current after passing through the series field magnets to the contact $N^4$, enters the armature through $n^4$, $N^2$ and the left hand brush, thus causing the armature to turn in the opposite direction.

My switch above described it will be observed, contains in one and the same mechanism the speed varying devices and reversing devices. My switch is also so arranged that when it is opened the brake is made outside of the terminal of the shunt field, and the latter has therefore a path for discharge through the series field and armature, so that the insulation of the shunt field is protected against disruptive effects of discharge.

On one of the car axles C is mounted the friction brake reducing gear mechanism by which the motion of the motor is properly reduced when delivered to the axle. This friction brake reducing gear mechanism comprises the pinion disk S which has bolted to it a brake wheel S', the latter being made in two halves; thus making a single wheel which has a wide bearing at $s'$, and another wide bearing at $s^2$ with the point of application of the brake band $S^9$ midway between, thus giving greater mechanical strength and rigidity; at the same time the shell $S'$ and the disk $S$ form a receptacle for holding oil or grease to lubricate the mechanism and also for deadening the noise made by the same. This is a very important point as comparative freedom from noise is very necessary in street car motors. The lubrication of pinions $p$ and sleeve pinion $p'$ is effected by holes $p^2 p^3$, bored at the bottom of the teeth through which oil or grease is forced into double spiral oil grooves $p^4 p^5$, which spread the same over the entire surface to be lubricated whichever way the gears are turned. A hole in $p'$ at $p^6$ serves to lubricate the bearing $s'$ while bearing $s^2$ has also a double spiral oil groove opening into the interior. A pipe T communicates with the interior so that more lubricant can be added when necessary. To prevent waste of lubricant bearings $s'$ $s^2$ may be provided with stuffing boxes. By removing one half of shell $S'$ the gears may be at any time examined. The two halves of the brake wheel $S'$ are secured together by bolts passing through ears or lugs $s^{20}$ on the halves of the brake wheel. The stuffing boxes at the bearings $s'$ $s^2$ are indicated at $s^{21}$ $s^{21}$. They may be of any ordinary construction.

To facilitate manufacture the internal gear $p^7$ and its spider $p^8$ are made separate; the teeth may then be cut by a milling tool (or a shaper) all the way across the face of the ring. This could not be done in a single piece as room would have to be allowed for clearance of tool. The ring, after the teeth are cut, is screwed onto the spider (a lug has been turned on same so as to insure centering) and the heads of screws left slightly below outer surface of the spider. The metal of the latter is then hammered over the heads of the screws to prevent their jarring out. Or the screws may be carried entirely through the ring and riveted on the other side. The stud $t$ is driven into position and its inner end riveted. The collar $t'$ is screwed up and a hole $t^2$ bored through it and into $t'$. A copper peg $t^3$ is then driven in the hole, binding $t^2$ in position. If necessary to remove the pinion from the stud the copper pin can easily be drilled out.

Commutator $f^{11}$ (see Fig. 5) has a hollow ring $f^{12}$ which is filled with burned shellac. This acts to prevent a flash of lightning from jumping from segments to the shaft and at the same time is a reservoir of lubricant for the mica strips between the segments. Mica wears away rapidly when exposed to the sparking on surface of commutator but is preserved by the presence of shellac or other gum or lubricant. This lubricant also prevents undue wear of the metal commutator segments $f^{11}$.

V is the brush of the commutator. The brush holder comprises a case or slide way $V'$ secured to the portion $d$ of the motor frame D, a brush holder, slide or box $V^2$ adapted to reciprocate in said case or slide way $V'$, a clamp plate $V^3$ for holding the brush in the box or slide $V^2$, a spring $V^4$ for giving a yielding pressure against the commutator segments and a hinged gate $V^5$ furnished with an adjusting screw $V^6$. The free end of the hinged gate $V^5$ fits in a notch $V^7$ cut in the guide case $V'$, so that by simply opening the gate the whole brush holder box or slide way may be bodily removed.

$V^8$ is the flexible connection connecting the brush or its box with the circuit.

I claim—

1. In an electric motor car the combination with the car and mechanism for communicating motion from the motor to the car, of an electric motor having field magnets furnished with both series field coils and shunt field coils, and an additional or choking magnet adapted to be placed in connection with the series field in starting the motor or car, substantially as specified.

2. In an electric motor car an electric motor having a field magnet composed in part of series connected coils, and in part of shunt connected coils, a switch for short circuiting one or more of the series field coils as occasion may require and an additional or choking magnet controlled by said switch and adapted to be put in or out of the series field, substantially as specified.

3. In an electric street car motor, the combination with the shaft or axle C of a friction brake reducing gear mechanism, comprising a pinion disk S and a brake wheel $S'$ secured together as one wheel, and having two wide bearings $s'$ and $s^2$, and provided with a brake surface midway between said bearings, substantially as specified.

4. In an electric street car motor, the combination with the shaft or axle C of a friction brake reducing mechanism comprising a pinion disk S and a brake wheel, said wheel or shell $S'$ being made in halves secured together and adapted to be separated to give access to the gearing, substantially as specified.

5. In an electric street car motor, the combination with the shaft or axle C of a friction brake reducing mechanism comprising a pinion disk S and a brake wheel $S'$, said disk S and wheel or shell $S'$ being secured together and together forming one hollow wheel containing the intermeshing pinions and filled with a lubricant to deaden the noise and to lubricate the parts, substantially as specified.

6. In a street car motor, the combination with the shaft or axle C of a friction brake reducing mechanism, comprising a pinion disk S and a two-part brake wheel $S'$ bolted thereto and together forming a single hollow wheel, pinions $p$, internal gear $p^7$ and sleeve pinion $p'$, said pinions having lubricant holes bored through them, and said wheel S $S'$ being filled with or containing lubricant, substantially as specified.

7. The reducing gear S, S′, with its pinions $p$ and sleeve pinion $p'$, in combination with an internal gear $p^7$ and its spider $p^8$, made in a separate piece from said internal gear, substantially as specified.

8. The street car motor switch N, comprising in combination stationary contact pieces $N^3$ $N^2$ $N^4$ $N^5$ $N'$ $N^6$, $n'$, $n^2$, $n^3$ and $n'$, $n^2$, $n^3$, and removable contact pieces $n$, $n^4$ and $n^5$, secured to a common operating bar, all arranged, combined and operating substantially as shown and described.

HAROLD P. BROWN.

Witnesses:
H. M. MUNDAY,
EMMA HACK.